April 12, 1955     O. M. SALATI     2,706,257
VOLTAGE LEVEL INDICATOR
Filed Dec. 1, 1952
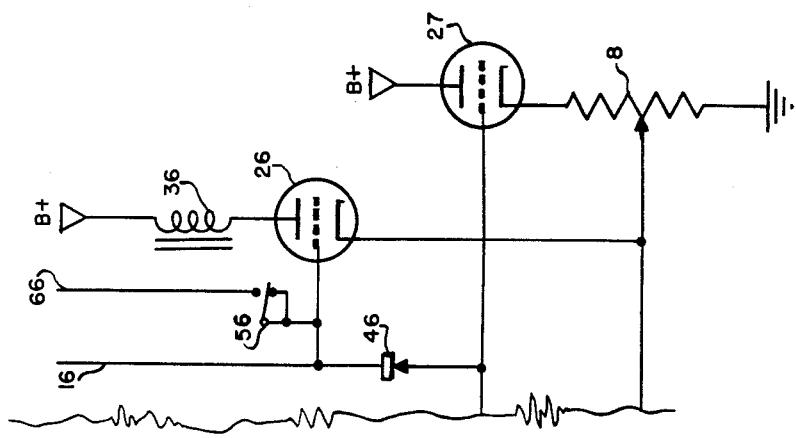
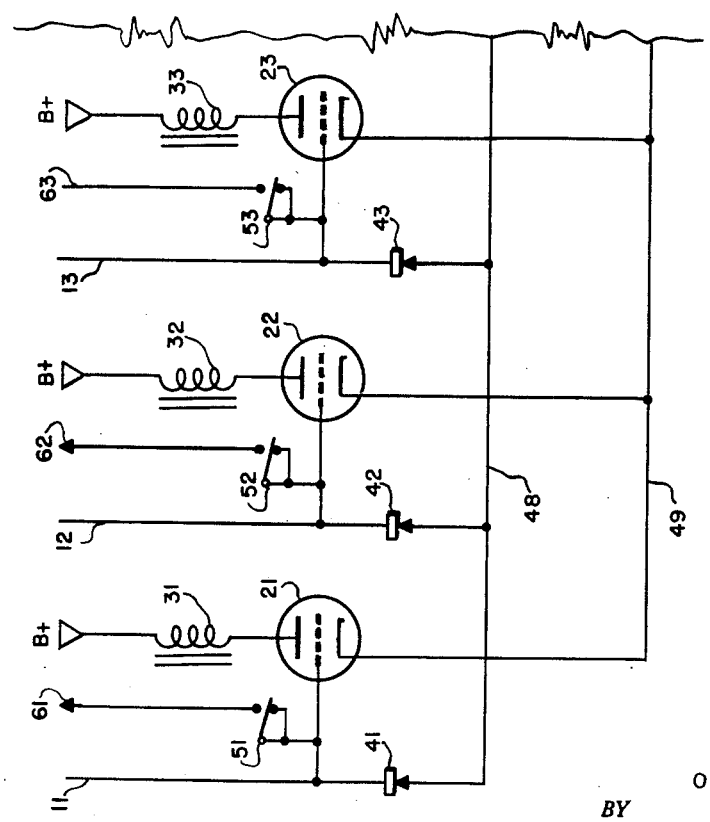
*INVENTOR.*
OCTAVIO M. SALATI
BY
*Harry M. Saragovitz*
*Attorney*

2,706,257
Patented Apr. 12, 1955

2,706,257

VOLTAGE LEVEL INDICATOR

Octavio M. Salati, Media, Pa., assignor to the United States of America as represented by the Secretary of the Army Application December 1, 1952, Serial No. 323,424

3 Claims. (Cl. 307—130)

This invention relates to voltage indicators and more particularly to a device for indicating peak voltages or all voltages above a certain level.

In this invention, a plurality of inputs are provided for sources of D. C. whose voltage level is unknown. Means are provided, associated with each input, for determining and indicating which is the maximum input voltage or which input voltages are above a certain percentage of the maximum.

This invention provides a flexible, accurate, and highly stable means for identifying voltages of or above a given level.

It is an object of this invention to provide a means for indicating voltage level.

It is a further object of this invention to provide a means for indicating a comparative voltage level.

It is a further object of this invention to provide a means for indicating the maximum of a series of voltages.

It is a further object of this invention to provide a means to indicate and transmit all voltages above a certain percentage of the maximum of a series of voltages.

Other and further objects of this invention will become apparent from the following specification and drawing, which shows a preferred embodiment of this invention.

In the drawing a series of inputs 11, 12, 13 and 16 connect to the grids of a series of tubes 21, 22, 23 and 26 whose anodes connect through relays 31, 32, 33 and 36 to a common high voltage supply B+. The inputs 11 through 16 also connect to one polarity of inputs of a series of rectifiers 41, 42, 43 and 46 whose opposite terminals connect to a common bus 48 and to the grid of tube 27 which is connected across the high voltage supply as a cathode follower with potentiometer 8 between cathode and ground. The cathodes of tubes 21 through 26 are connected to a common bus 49 and to the variable tap of potentiometer 8.

The relays 31 through 36 actuate switches 51 through 56 respectively to connect the appropriate input voltage or voltages to the corresponding outputs 61 through 66.

In operation, a series of voltages are applied to the inputs 11 through 16. If it is desired, for example, to determine which of the voltages is the maximum, the potentiometer 8 is set at substantially cathode voltage. The bus 48 connected to the grid of tube 27 would be drawn up to the highest voltage of the incoming signals since this is the low impedance direction of the rectifiers. The remaining voltages would not affect the bus since they are now on the high impedance side of the corresponding rectifiers. The bus bar 48 being drawn up to the value of the highest incoming voltage draws the cathode of the cathode follower 27 to approximately the same value. The cathode of tube 27 in turn provides the voltage level of bus 49 and the cathodes of the tubes 21 through 26. The tube corresponding to the input having the highest voltage, where the grid is equal to or greater than the cathode voltage, will conduct current, whereas the other tubes having input grid voltages substantially lower than their cathode voltages will not conduct current. The tube conducting current actuates the coil in its relay which in turn actuates its switch to connect this particular input voltage to any outside circuit through one of the output leads 61 through 66.

If it is desired to determine all the voltages above a certain percentage of the maximum voltage received, the potentiometer 8 in the cathode circuit of tube 27 is set to the desired percentage so that all of the input signals above that level will cause their respective tubes to conduct and actuate their respective switches and connect those particular voltages to any desired outside circuit.

If all the input levels of a certain percentage of a fixed value are desired, one of the inputs can be held constant at the fixed value with the other inputs being variable. The level of cathode follower 27 is established by the fixed level as a minimum and all other voltage levels within a certain percentage of that level will actuate their respective relays and switches.

The outputs of these circuits can be combined with the outputs of similar circuits to obtain a maximum voltage or all voltages above a certain percentage of maximum for a much greater series of incoming signals.

While vacuum tubes are shown in this preferred embodiment of this invention it is obvious that other non-linear devices could be employed to pass current and indicate the maximum voltage as in this case. The relays also may be replaced by other types of indicating device such as gaseous discharge tubes.

The cathode follower 27 is a much heavier tube and draws more current than any of the individual tubes 21 through 26 of the indicating circuits. This provides a highly stable reference voltage level, that is not affected by transients and changes in load as would be a single cathode resistor from the common cathode bus 49 to ground.

What is claimed is:

1. In a device for determining the relative level of a series of input voltages, sources for supplying said input voltages, rectifiers connected to each of said sources, the other sides of said rectifiers connected together and to the grid of a first vacuum tube, an impedance in the cathode of said first vacuum tube, each of said sources connected to the grids of other vacuum tubes, the cathodes of said other vacuum tubes connected together and to the cathode of said first vacuum tube, electromagnetic relays connected in the plate circuits of said other vacuum tubes, and switches actuated by said relays connecting the sources corresponding to the other vacuum tubes to external circuits.

2. In a device for determining the relative level of a series of input voltages, sources for suppling said input voltages, rectifiers corresponding to said sources, the positive terminals of said rectifiers connected to each of said sources, the negative terminals of said rectifiers connected together and to the grid of a first vacuum tube, an impedance in the cathode of said first vacuum tube, each of said sources connected to the grids of other vacuum tubes, the cathodes of said other vacuum tubes connected together and to the cathode of said first vacuum tube, electromagnetic relays connected in the plate circuits of said other vacuum tubes and switches actuated by said relays connecting the sources corresponding to given relays to other circuits.

3. In a device for determining the relative level of a series of input voltages, sources for supplying said input voltages, rectifiers corresponding to said sources, the positive terminals of each of said rectifiers connected to one of said sources, the negative terminals of each of said rectifiers connected together and to the grid of a first vacuum tube, a voltage dividing impedance having a variable tap in the cathode of said first vacuum tube, each of said sources connected to a grid of other vacuum tubes corresponding to said sources, the cathodes of said other vacuum tubes connected together and to the variable tap of said voltage dividing impedance, electromagnetic relays connected in the plate circuits of said other vacuum tubes, and switches corresponding to and actuated by said relays, each of said switches, when actuated, connecting one of said sources to an external circuit.

References Cited in the file of this patent

UNITED STATES PATENTS 1,801,657    Bouyko _____ Apr. 21, 1931